May 18, 1965 C. L. EDWARDS, JR 3,183,945
PRESSURIZED WATER TANK FOR FILLING VEHICLE TIRES
Filed March 14, 1962
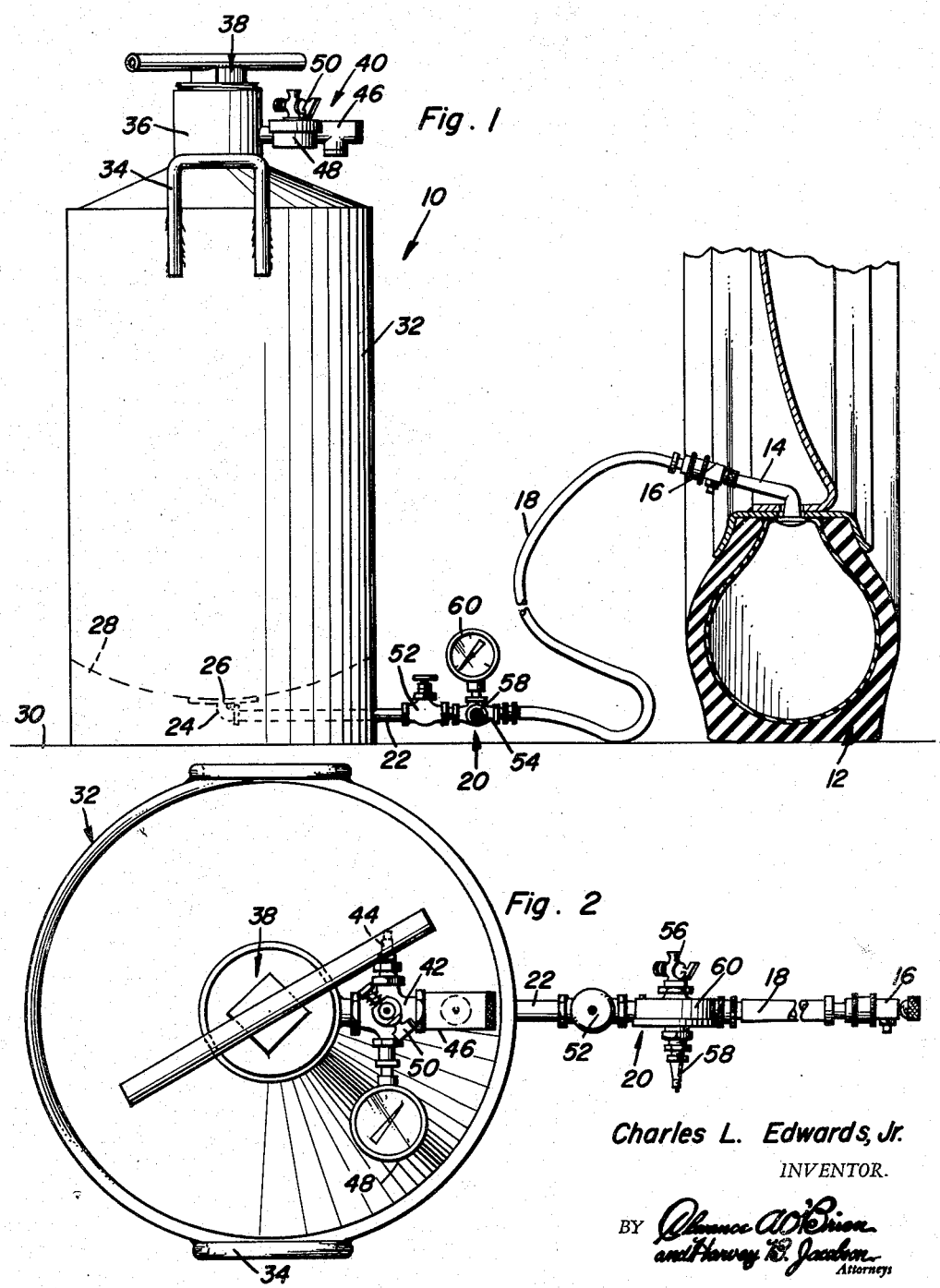
Charles L. Edwards, Jr.
INVENTOR.

3,183,945
PRESSURIZED WATER TANK FOR FILLING VEHICLE TIRES
Charles L. Edwards, Jr., 306 E. Park Ave., Tarboro, N.C.
Filed Mar. 14, 1962, Ser. No. 179,633
6 Claims. (Cl. 141—38)

This invention relates to apparatus for filling pneumatic tires on tractor-type vehicles with air or liquid.

The primary purpose of the apparatus of the present invention, is to fill the pneumatic tires of a tractor with liquid so as to increase the weight thereof but distribute it in such a manner as to increase the traction of the vehicle. A main object of the present invention therefore, is to provide apparatus for such purpose capable of being utilized in a more facile manner.

Another object of the present invention is to provide apparatus for filling pneumatic vehicle tires with water for purposes aforementioned, which apparatus is portable, less costly to manufacture, and more easily serviced.

In accordance with the foregoing objects, the water filling apparatus of the present invention includes a cylindrical tank adapted to contain the tire filling liquid which may be in the form of a solution of water and an antifreeze such sa calcium chloride. The liquid tank is accordingly provided with means for supplying air under pressure above the liquid so that the liquid may be controllably displaced from the tank by the air pressure for tire filling purposes. Accordingly, an outlet conduit is connected to the bottom of the tank and controlled by a manual gate valve for supply of liquid under pressure through a flexible hose to the tire through its one-way inlet valve. By closing the gate valve, the same flexible conduit may be utilized for inflating the tire with air under pressure when it is desired to fill the tire with air while the same filling air under pressure may be utilized to blow out the tire or displace liquid therefrom back into the tank by opening of the gate valve after the air pressure within the tank has been vented. The gate valve may also be utilized for draining the tank of liquid when desired in which case, the flexible hose will be disconnected from the tire. The pressure conditions within the tank and in the outlet conduit are also conveniently detected by use of air pressure gauges respectively connected to the tank and the outlet conduit inasmuch as liquid displacement is achieved by trapped air pressure rather than a continuous supply of air requiring the presence of compressor equipment at all times. Also, a manually controlled pressure release valve will be provided so that the air pressure within the tank may be vented when desired. A further feature of the apparatus involves the downward curvature of the bottom of the liquid tank toward a central portion to which the outlet conduit is connected so as to avoid accumulation of sediment within the tank and insure removal thereof when draining the tank of liquid.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the tire filling apparatus shown applied to a pneumatic tire.

FIGURE 2 is a top plan view of the apparatus illustrated in FIGURE 1.

Referring now to the drawings in detail, it will be observed that the liquid filling apparatus of the present invention generally referred to by reference numeral 10, is utilized for filling of a pneumatic tire generally referred to by reference number 12 which tire 12 includes a conventional one-way tire pressure inlet valve 14. Accordingly, a tire valve connecter 16 is secured to the tire inlet valve 14, the connecter 16 being connected to a terminal end of a flexible hose 18. The flexible hose 18 is connected by means of a filling outlet assembly generally referred to by reference numeral 20 to an outlet conduit 22. The outlet conduit 22 is connected through an elbow to a liquid outlet opening 26 located at a central portion of a downwardly curved and necessarily imperforate bottom 28 disposed in spaced relation above the supporting surface 30 upon which a cylindrical liquid containing tank 32 rests.

The tank 32 has connected thereto adjacent the upper end thereof, a pair of handles 34 by means of which the apparatus may be carried from place to place. An inlet portion 36 is connected to the upper end of the tank 32 through which the tank may be recharged with liquid. The liquid is preferably a water solution of calcium chloride whereby freezing of the water is prevented. The inlet portion 36 is therefore provided with a sealing tank closure member 38 whereby the chamber within the tank may be rendered pressure tight.

Connected to the inlet portion 36 and in fluid communication with the tank chamber therethrough, is a liquid displacing control assembly generally referred to by reference numeral 40.

The liquid displacing control assembly 40 includes a cross coupling member 42 which mounts a one-way air inlet valve 44 through which air under pressure may be introduced into the tank above the liquid therein for the purpose of pressurizing the liquid so that upon actuation of the outlet control assembly 20, for liquid filling of the tire 12, the liquid in the tank may flow from the tank into the tire. Also connected to the cross coupling member 42, is a relief valve assembly 46 by means of which the maximum tank pressure will not be exceeded. Also connected to the cross coupling member 42, is an air pressure gauge 48 by means of which the pressure within the tank may be observed. Finally, connected to the cross coupling member 42, is a manually controlled pressure release valve 50 selectively operative to release the air pressure from the tank. Accordingly, liquid displacing air under pressure may be confined within the tank 32 after supply thereto by a source of pressure through the one-way inlet valve 44. The tank so charged with trapped air under pressure may be utilized as long as said air pressure as indicated on the air pressure gauge 48 indicates it is sufficient to accomplish the purposes. When desirable, the air pressure may be vented through the pressure release valve 50.

The outlet control assembly 20 is therefore utilized in accordance with the conditions within the tank 32 for filling the tire 12 with liquid, filling it with air, removing the liquid from the tire and finally for draining the tank of liquid. The control assembly 20 therefore includes a manually controlled discharge shut-off gate valve 52 by means of which flow of liquid may be stopped. Connected to the gate valve 52, is a coupling member 54 to which a manually controlled air bleed valve 56 is connected, an air filling one-way inlet valve 58 and a pressure indicating gauge 60. It will therefore be apparent, that when the liquid within the tank is under pressure, upon opening of the gate valve 52, the tire 12 will be filled with liquid pressurized by the trapped air in the tank which will decline in pressure as monitored on gauge 48. When the pressure within the tire filled with liquid reaches a desirable value as indicated on the separate gauge 60, the gate valve 52 may be closed. On the other hand, should it be desired to inflate the tire 12 with air the gate valve 52 will be closed and air under pressure supplied through the inlet valve 58. In the event it is desired to remove liquid from the tire, the gate valve 52 is closed and air under pressure supplied through the valve 58 until pressure in the tire reaches approximately 40 p.s.i. as indicated on the gauge 60. The closure assembly 38 is then removed from the tank 32 to relieve the pressure on the liquid and valve 52 opened so that the liquid under pressure in the tire is forced back into the tank. The procedure is then repeated until all liquid has been forced out of the tire. The valve 56 may be utilized to bleed air under pressure from the tire without getting wet by opening thereof after the gate valve 52 has been closed. This may be necessary when there is too much liquid in the tank for the tire causing a more rapid decline in the air pressure trapped in the tank because of the reduced volume thereof. In this latter regard, it will be appreciated that liquid will flow from the tank to the tire only when sufficient pressure differential exists as monitored by observing the relative pressure measured by the gauges 48 and 60. When the pressure differential becomes too low because of the declining air pressure in the tank and the rising pressure in the tire hose 18 to support flow of liquid, opening of the bleed valve will be effective to reduce the pressure in the hose 18 and tire in order to reestablish a sufficient pressure differential to resume filling of the tire with the liquid. Finally, the outlet control assembly 20 may be utilized to drain the tank of liquid by disconnecting the tire inlet connector 16 from the tire, pressurizing the tank with air under pressure and opening the gate valve 52.

From the foregoing description, the utility and operation of the liquid tire filling apparatus of the present invention will be apparent. It will therefore be appreciated, that filling of tires with either liquid or air may be accomplished through use of apparatus which is portable, involves no moving parts, and replaces expensive gear pump mechanisms heretofore necessary to provide continuous supply of pressure or vacuum to the liquid containing tank.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for filling a pneumatic tire with air or liquid and withdrawing air or liquid therefrom comprising, a tank adapted to contain a liquid under pressure or sustain air pressure above atmospheric, means for monitoring the air pressure sustained in said tank independently of said tire, a liquid pipe opening into said tank at the bottom thereof forming a single liquid discharge connection, a tire connection coupling head provided with a pressure gage connected to said liquid pipe for monitoring the pressure therein, a single manually controlled liquid discharge valve provided in said liquid pipe in advance of said pressure gauge, a tire conduit connected to said head to permit said tire to be filled with either liquid from the discharge valve or air through the coupling head, and manually controlled bleed valve means connected to the coupling head for controlling the pressure in said tire conduit as monitored by the pressure gauge to regulate flow of the liquid into the tire.

2. Apparatus for filling pneumatic tires with gas or liquid and withdrawing gas or liquid from the tire comprising, pressure tight chamber means containing separated liquid and gas under a predetermined charge pressure, outlet means operatively connected to said chamber means for displacement of all of said liquid from the chamber means by the gas when draining the chamber means, discharge valve means operatively connected to the outlet means to selectively block discharge of the liquid from the chamber means, conduit means operatively conducting flow of said liquid from the chamber means to either a pressure region or for draining the chamber means of liquid in response to a difference between the pressure of the liquid in said outlet means and said charge pressure of the gas in the chamber means, means for connecting the conduit means to said pressure region for either filling thereof with liquid or withdrawing the liquid therefrom, coupling control means operatively connecting said conduit means to the discharge valve means for either pressurizing the pressure region with gas or by said liquid discharged through the discharge valve means, pressure gauge means operatively connected to the chamber means and the control coupling means respectively for monitoring said difference in pressure which induces the flow of the liquid through the conduit means, and pressure vent means operatively connected to the chamber means and the control coupling means for directionally controlling said difference in pressure to either fill or withdraw the liquid from the pressure region.

3. The combination of claim 2, wherein said pressure vent means includes, bleed valve means operatively connected to the coupling control means for reducing the pressure in the conduit means to regulate the flow of the liquid when filling the pressure region therewith.

4. The combination of claim 3, wherein said pressure vent means further includes, means for relieving the charge pressure of the gas in the chamber means to withdraw the liquid from the pressure region into the chamber means.

5. The combination of claim 2, wherein said pressure vent means includes, means for relieving the charge pressure of the gas in the chamber means to withdraw the liquid from the pressure region into the chamber means.

6. For use with apparatus utilized to fill a pneumatic tire with liquid displaced by air under an initial charge pressure from a pressure tight tank, a method for withdrawing said liquid from the tire comprising the steps of: blocking fluid communication between the tire and the tank; pressurizing the tire with air to increase the pressure on the liquid therein to a fixed monitored value; venting the charge pressure within the tank; reestablishing fluid communication between the air pressurized tire and the vented tank until the monitored pressure in the tire is reduced substantially to an extent known to be insufficient to induce flow of the liquid into the tank; and thereafter repressurizing the tire with air and reestablishing said fluid communication between the tire and tank in repeated sequence until the liquid is completely withdrawn from the tire, whereby said apparatus may be used for both filling and withdrawing liquid from the tire without any continuous control or supply of air pressure for the tank or the tire.

References Cited by the Examiner
UNITED STATES PATENTS

| 840,469 | 1/07 | Berry | 141—38 |
| 2,488,946 | 11/49 | Turpin | 141—38 |
| 2,652,181 | 9/53 | Rupp | 141—38 |
| 3,043,348 | 7/62 | Wellsch | 141—38 |

LAVERNE D. GEIGER, *Primary Examiner.*